United States Patent [19]

Bezjian

[11] Patent Number: 5,491,779
[45] Date of Patent: Feb. 13, 1996

[54] THREE DIMENSIONAL PRESENTATION OF MULTIPLE DATA SETS IN UNITARY FORMAT WITH PIE CHARTS

[76] Inventor: Richard D. Bezjian, 50 Frost Rd., Belmont, Mass. 02178

[21] Appl. No.: 863,234

[22] Filed: Apr. 3, 1992

[51] Int. Cl.⁶ ................................................. G06T 17/10
[52] U.S. Cl. ........................ 395/140; 395/141; 395/119
[58] Field of Search ............................. 395/119, 140, 395/131, 141; 345/133, 140

[56] References Cited

U.S. PATENT DOCUMENTS

| | | | |
|---|---|---|---|
| 4,633,448 | 12/1986 | Koeijmans | 345/133 X |
| 4,800,510 | 1/1989 | Vinberg et al. | 395/140 |
| 4,944,034 | 7/1990 | Ohsawa | 395/119 X |
| 5,015,188 | 5/1991 | Pellosie, Jr. et al. | 395/119 X |
| 5,067,167 | 11/1991 | Berger | 395/119 X |
| 5,075,873 | 12/1991 | Seki et al. | 395/140 |
| 5,129,054 | 7/1992 | Alstad et al. | 395/119 X |
| 5,148,154 | 9/1992 | Mackay et al. | 395/119 X |
| 5,177,474 | 1/1993 | Kadota | 395/119 X |
| 5,187,660 | 2/1993 | Civanlar et al. | 395/119 X |
| 5,228,119 | 7/1993 | Mihclisin et al. | 395/119 |
| 5,333,244 | 7/1994 | Harashima | 395/119 |
| 5,335,317 | 8/1994 | Yamashita et al. | 395/119 |

OTHER PUBLICATIONS

Que, Using Quattro Pro 3 Special Edition, 1991, pp. 451–467.
Colb et al, Running Microsoft Excel, 1991, pp. 1X, 164, 370–377, 396–405, 418–429.
Mihalisin et al, Visualization & Analysis of Multi-Variate Data, Proc. Visualization '91, Oct. 22, 1991, pp. 171–178.
Kleiner et al, Representing Points in Many Dimensions by Trees and Costles, Journal of American Statistical Association, Jun. 1981, vol. 76, No. 374, pp. 260–276.
Cleveland et al, Graphical Perception: Theory, Experimentation, and Application to the Development of Graphical Methods, Journal of American Statistical Assoc, Sep. 1984, pp. 531–554 vol. 79 No. 387.
Tufte, The Visual Display of Quantitative Information, 1983, pp. 40, 42–45, 62, 63, 108, 109, 118, 119, 134, 145–148.
Mellin, Getting The Most Out of Hollywood, 1991, pp. 226–229.
Schmid, Handbook of Graphic Presentation, 1954, pp. 164–169.
Statsoft, CSS: Statistica vol. III, CSS: Graphics Manual, 1991, pp. GRA–233, GRA–234, GRA–252, GRA 289 to GRA 295, GRA–304.

Primary Examiner—Heather R. Herndon
Assistant Examiner—Anton W. Fetting
Attorney, Agent, or Firm—Hamilton, Brook, Smith & Reynolds

[57] ABSTRACT

Pie, bar and line charts are extended in plural dimensions to graphically illustrate plural data sets. In a pie figure, the angle of each slice is defined by a first data set, and both the thickness and radius of each pie slice may be defined in accordance with second and third data sets. In a bar graph, the height of each bar is defined by a first data set, and the thickness and width of each bar may be defined by second and third data sets. In a line graph, the position of the line is defined by a first data set while the thickness and width of the line may be defined by second and third data sets. Scales may be positioned adjacent to the pie chart to measure the additional dimensions, and the pie chart may be rotated to position taller slices behind shorter ones.

8 Claims, 6 Drawing Sheets

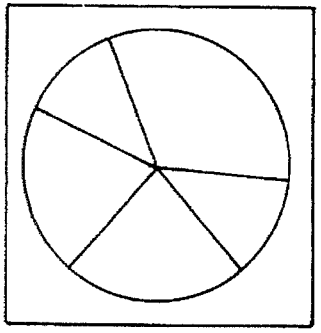
FIG IA
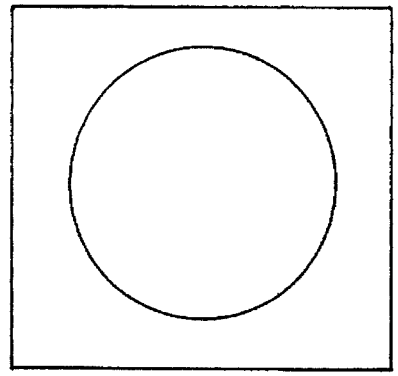
FIG. IA-1
| Region | Data Set 2 Population in Millions |
|---|---|
| East | 80 |
| Central | 70 |
| West | 100 |
FIG. IA-2
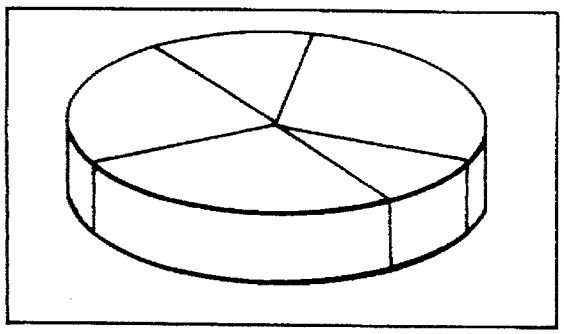
FIG. IB

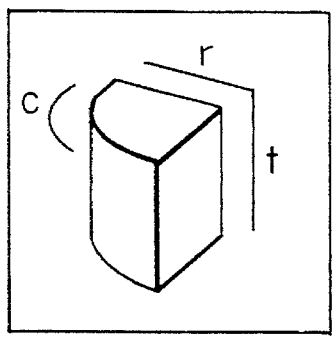
FIG. 2A
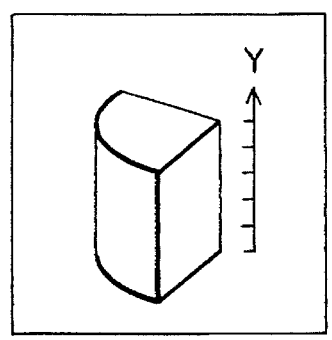
FIG. 2A-1
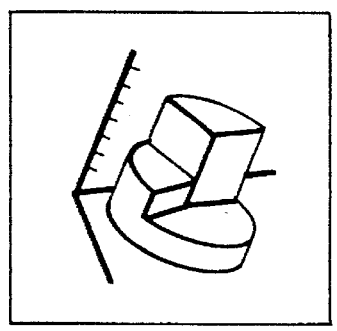
FIG. 2A-2
| Region | Data Set 2 Usage of Soap |
|--------|--------------------------|
| East | 88 |
| Central | 75 |
| West | 40 |
FIG. 2A-3

THREE DIMENSIONAL PRESENTATION OF MULTIPLE DATA SETS IN UNITARY FORMAT WITH PIE CHARTS

FIELD OF THE INVENTION

This relates generally to the representation of data in a graphical form, in particular to a method of representation of data in a three dimensional form.

BACKGROUND OF THE INVENTION

This application relates to the art of representing a number of different sets of data or information in a single unified graphical picture. In general One Data Point is represented by a single number or a single data, e.g. 23. A sequence, or a group, or a collection of many Data Points together represent One Set of Data, hereinafter referred to as "Data Set", e.g. 23, 45, 26, 56.7, 103.34.

In the prior art and in specific terms, a pie figure or a graph, is a round shaped figure. It may be circular in nature or elliptical, however, it has the round circular shape. The whole circle is considered to be the whole pie FIG. 1a1. This figure has been used in the past to graphically represent data. The data that it represents can be any measurement or data. Example: Assuming that the population of USA is 250 million (250,000,000), a Pie can represent this number. In such a case it will simply be a single one complete circular pie.

The benefit of a pie figure, however, is seen when it represents more than one number or Data together. In our population example, let us assume the person wishes to show the US population as it exists in the 3 regions of USA, namely: East, Central and West. Each region would have its population number, and thus 3 numbers will together represent the total US population. The 3 numbers together are called "One DATA SET". In our example, FIG. 1a2 shows this Population Data set with three identities the 3 regions, and their corresponding population numbers. To represent the three regions together on the same pie figure would give the advantage that any viewer can look at the figure and visually understand the relationship in size of each region to the others, and also to the whole pie, which is the whole population. To achieve this result the single whole pie is divided into 3 parts, each part is called a "Pie Slice".

The size of each slice will correspond to the population number of the region it represents. The whole pie will represent the whole population figure of 250 million, and the 3 slices will represent the population numbers of the individual regions. For ease of reference the slices can be labeled with the identity text EAST, CENTRAL and WEST, and even the population number that a slice represents can be placed on or next to that specific slice.

If one would change the population numbers for any of the regions, then the pie can be modified to be re-drawn, with the sizes of the slices modified to correspond to their new proportions.

This pie figure, or for that matter any similar Bar or Line figures representing data, can be drawn by hand on paper. In the case of the Pie, the person must do the proper calculations, to find the proper size of each slice, which is the proper Angle or also referred to herein as "Contour" (c) of the slice FIG. 2a. In this case, the whole pie having 360 degrees, constitutes the whole population of 250 million. In other words a population of 1 million would be proportionate to a pie slice with the size of 360/250=1.44 degrees.

Each region's population would result to a pie slice with an angle proportional to its size. In our example, the region EAST, being 80 Million, will correspond to:

1.44 degrees multiplied by 80=115.2 degrees

Therefore the person drawing this figure would draw a slice in the pie with the size of 115.2 degrees. This method will be followed until the person draws all the other slices. The operation can also be done with a computer program, where a program can be written to accept these numbers, or a Data Set, do the proper calculations, and display on the screen of the computer the resulting pie figure. Changing any of the numbers in the data set, can result in the program recalculating and re-drawing the new pie with the new pie slice proportions.

In similar prior art, the pies can be viewed or displayed at an angle, and a thickness is given to the pie FIG. 1b. This thickness gives the pie a 3 dimensional look. It does not represent any data or any quantitative measure.

In accordance with a preferred arrangement, this invention makes use of the thickness of the pie, and in general it makes use of all 3 dimensions of a Pie slice, or a bar or a line, to represent different Data Sets or information together in a single Pie slice, or a single 3 dimensional bar or line element.

The specific graphical figures included in this application are: a) A round shaped picture much like a pie, (FIG. 1a) with slices defined by the lines generating from its center, this figure hereinafter referred to as "Simple Pie Graph" represents data, b) Bar and Line pictures, with the bars defined and formed by rectangles, and the lines defined and formed by actual lines, these figures hereinafter referred to as "Simple Bar Graph" (FIG. 1c) and "Simple Line Graph" (FIG. 1d) correspondingly represent data.

Graphical figures or pictures of these types do exist commonly. Other known graphical figures also exist where the figures have a perspective arrangement also known as 3-D (FIGS. 1b, 1e and 1f), However, no additional information is provided by the 3 dimensional look of these figures.

SUMMARY OF THE INVENTION

In the case of the Simple Pie, each slice corresponds to a specific data in the Data Set, and all the slices together constitute the whole pie, giving a clear correspondence of the slices to each other's size and also in relation to the whole pie. A simple 3-D pie (FIG. 1b) is the pie itself viewed at an angle such that the pie will have a thickness. Correspondingly any "Element" of the pie, hereinafter referred to as "Slice Element" (FIG. 2a) has a "Thickness" (t), a "Radial Size" (r) and a "Contour Size" (c). These 3 sizes of the single Element of the Pie Slice constitute the 3 distinct dimensions of the 3-D Slice Element, and all the 3d Pie Slice Elements together constitute the 3-D Pie. In traditional pie figures, the thicknesses of all the slices in the Pie are the same. This invention relates to the ability to represent a number of different sets of numerical data by the Pie slice element, where the 3 distinct dimensions of the 3-D Slice Element can be independent from one another and vary from one slice to another.

A preferred data processing system of the invention creates a pie chart figure that is three dimensional, where the first and second dimensions characterize one set of data, yet the third dimension Characterizes another Data Set. Hence, in our new novel Pie, each Pie Slice Element will have 3 dimensions, and all 3 can be different than the corresponding dimensions of the other Slice Elements in the pie (FIG. 3), where the Thickness of Slice Element 1 is different than the Thickness of Slice Element 2. Further, these thicknesses represent quantitative measures, information or data. The advantages of such a graph for data representation are superior to the older existing methods. Hereinafter, we will name such graph as "Multilevel-Slice 3 dimensional Block Pie Graph", or "3-D Block Pie" for short. Now with this process, a very beneficial graphical representation can be made where not one, but a number of Data Sets are represented in one pie graph picture. The use of computers to display such graphs gives added advantages. A computer program can accept different data sets and perform calculations on and manipulations of the data sets. The computer program written for such representation of more than one Data Set in a single Pie Graph, can be written with the specific ability to allow the user to rotate the three dimensional pie in any direction, and thus be able to see different aspects or different perspectives of the graph. This becomes a critical advantage in situations where one big Slice Element can cover and hide a smaller adjacent Slice Element. Yet the program will give the user the ability and the option to rotate the graph in certain directions such that the user can view, see or examine the smaller Slice Element.

FIG. 3a, shows the new pie graph referred to as "3-D Block Pie". FIG. 4a shows the correspondence of the 2 Data Sets to the 3-D Block Pie. In FIG. 4a, Data Set 1 is represented by the different Contour (c) sizes of the slices, and Data Set 2 is represented by the different Thicknesses (t)of the slices.

Graphical figures such as the Pie chart can be used to represent data. They allow the viewer of these figures to associate numerical data to graphical representations. This can help people to understand and relate more easily to the size or magnitude of the numerical figures.

There is great benefit in representing more than one Data set in one graphical figure such as a pie figure.

Pie figures of known types have existed to represent data. However, these figures only represent one Data set. In order to represent another Data set, a totally new Pie figure must be drawn.

This invention allows a preferred method of representing many different Data Sets in one pie figure. This is achieved by first representing the pie figure in a 3 dimensional form, second by associating different Data sets to the different Dimensions of the pie itself, and third by allowing the 3 distinct dimensions of each element of the Pie known as Pie Slice Element to vary from one Pie Slice Element to the other.

It is a principal object of this invention to provide an improved method of representing data, where the viewer can understand and relate to not one but to a number of different Data sets or Information by looking and examining one single graphical figure.

It is an additional object of this invention to provide scientists, businessmen, and all viewers of these graphical figures, the ability to view a number of different but Data Sets related (or a number of different related sets of information) to one another, as each set of information would be represented in the single unified figure.

BRIEF DESCRIPTION OF THE DRAWINGS

This invention can take form in different arrangements and can have a number of different elements, orientations and specifications. These are illustrated in the accompanying drawings herein.

FIG. 1a is a plan view of a Simple 2 dimensional Pie figure, with pie slices of different sizes;

FIG. 1a1 simple whole pie with one 360 degrees angle pie slice.

FIG. 1a2, is a data table for Data Set 1 with population numbers for each region;

FIG. 1b is a perspective view of a pie figure, where the perspective angle indicates the thickness of the whole pie;

FIG. 1c is a simple 2 dimensional Bar graph or bar figure where each bar is a rectangle where the height of the rectangle represents a single data point;

FIG. 1d is a simple 2 dimensional line graph or line figure, where each point on the line has an X and a Y value;

FIG. 1e is a perspective view of a bar graph. The perspective angle indicates the thickness of the bar elements;

FIG. 1f is perspective view of a line graph or figure. The perspective angle indicates the thickness of the line;

FIG. 2a is a single 3 dimensional Pie Slice Element with 3 distinct sides of "Thickness" (t), the "Radial Size" (r) and "Contour Size" (c);

FIG. 2a1 is a 3 Dimensional Pie Slice element placed along the Y axis to indicate the scale of the slice thickness;

FIG. 2a2 is a 3-D Block pie placed along an XYZ axes;

FIG. 2a3 is a data table for Data Set 2 with soap usage numbers for each region;

DETAILED DESCRIPTION OF THE INVENTION

Figure 3A:
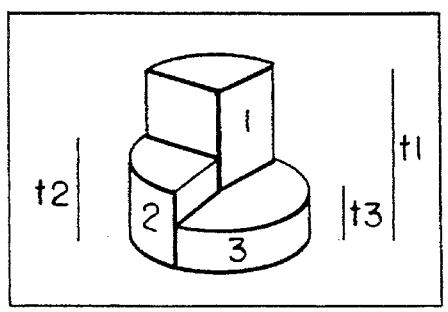
FIG. 3a is a 3 dimensional 3-D Block pie showing that the different slices can have different Thicknesses.

Referring now to the drawings which illustrate and indicate the different aspects of this invention, FIG. 3a and FIG.

4a show the method by which different Data Sets are represented together in one single 3 Dimensional Block Pie.

Figure 2B:
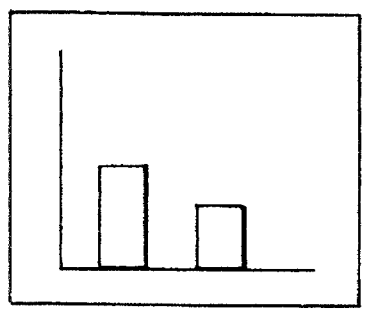
FIG. 2b is a single 3 dimensional Bar Element, having 3 distinct sides of "Thickness" (t), "Width" (w) and "Height" (h)
Figure 2B:
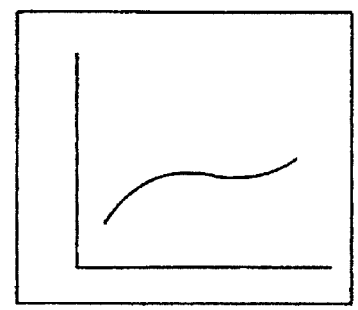
Figure 2B:
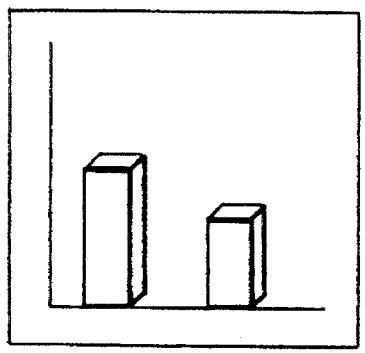
Figure 2B:
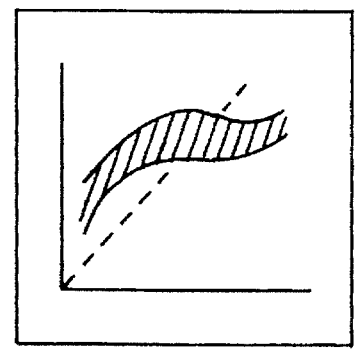
Figure 2B:
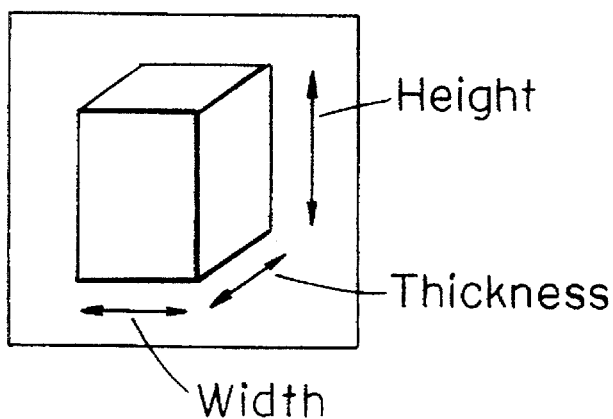

FIG. 2a indicates the smallest element of Pie. This element is named a Pie Slice Element. The collection of all the pie slice elements together in in one graphical picture represents the whole pie FIG. 3a. Each Pie slice element has 3 sides.

This preferred embodiment associates these sides to the 3 dimensions of X, Y and Z. In accordance to this invention, each dimension can be different from those of another pie slice element in the same pie. To help identify the 3 different sides of the pie slice element FIG. 2a, names are given to these sides and they are: "Thickness" (t), a "Radial Size" (r) and a "Contour Size" (c). Thickness of one slice may be different from the thickness of another slice in the same pie. The Radial size of one slice may also be different from the radial size of another slice in the same pie.

In the prior art, the thickness FIG. 2a (t) would be the same for all the Slices in the Pie. In our preferred embodiment, the thicknesses of each slice can vary from one to another. Each slice's Thickness would represent to a value or a number in another Data Set. To graphically show a correspondence of thickness to value, an axis with certain units of scales can be placed along the thickness of the 3 Dimensional Pie Slice element. FIG. 2a1 is the same as FIG. 2a, with the addition of a vertical Y axis along the "Thickness (t) of the Pie Slice. The axis represents a certain scale of measure.

Therefore, placing of the axes next to the Pie will render the pie thicknesses a measure of scale. Each Slice thickness will correspond to a certain measure as measured on that scale.

To further explain this method, we will use the US population example described earlier. Let us consider the new set of information about the 3 USA regions FIG. 2a3, which is the use of Soap in tons by the population of each of these regions. This would be DATA SET 2. In order to show graphically both Data Sets in the single Pie figure, this new method allows the Population numbers, which is Data set 1, to be associated with or represented by the Angle or the Contour sizes of the 3 pie slices. The Soap usage numbers, which is Data Set 2, will be associated with or represented by the Thicknesses (t) of the 3 pie slices. The resulting figure would be the 3-D Block pie. The vertical scale Y axis placed next to the 3-D Block pie will represent the scale in tons for the Soap usage. In particular it would define the scale of measure for the Thicknesses of the 3 Dimensional pie slices.

Figure 4A:
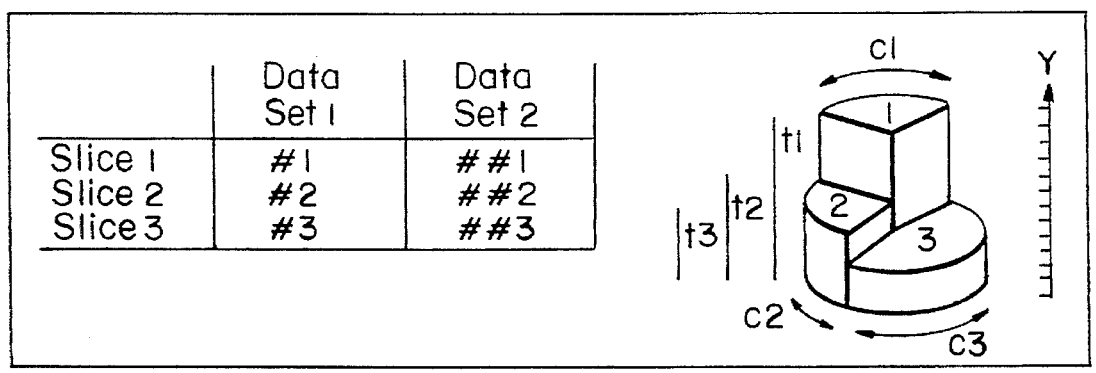
FIG. 4a shows the correspondence of the different Data Sets to the different parts of the 3-D Block Pie.

Therefore, a 3 dimensional pie can be constructed or displayed, where the different pie slice elements have different dimensions. Hence, more than 1 Data set can be represented by the same 3 Dimensional Pie, where all the thicknesses of the slices can represent one data set, and all the Contour sizes can represent another Data set. FIG. 4a shows a table of data. It includes 2 Data sets, namely Data set 1 and Data set 2. Each Data set has 3 values. In the example of FIG. 4a, the values for Data set 1 are noted as #1, #2 and #3, and those of Data set 2 are noted to be ##1, ##2 and ##3. With the prior method of data representation, only one of these Data sets could have been represented by one pie FIG. 1a. However, with this new method both Data sets could be represented graphically together in the same pie. FIG. 4a indicates that in such a 3-D Block Pie, the numbers in Data set 1 correspond to the contour sizes (c) of the pie slice elements. In specific, c1 represents #1 of Slice 1 Data Set 1, c2 represents #2 of Slice 2 Data Set 1, and c3 represents #3 of Slice 3 Data Set 1. In the same FIG. 4a, Thickness t1 represents ##1 of Slice 1 Data Set 2, t2 represents ##2 of Slice 2 Data Set 2, and t3 represents ##3 of Slice 3 Data Set 2. The numbers in Data set 2 correspond to the thicknesses (t) of the pie slice elements.

Figure 5A:
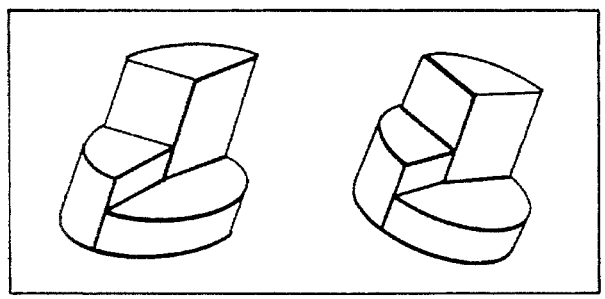
FIG. 5a is a view of the 3-D Block Pie at different tilts or directions than the vertical direction.
Figure 6A:
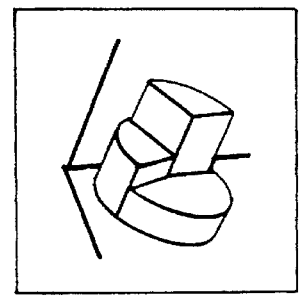
FIG. 6a shows the placement of the 3-D Block Pie on a 3 dimensional axes system, namely the X Y and Z axes.

FIG. 5a shows the display of such 3-D Block Pie in different directions. Since the pie has been rendered a 3 dimensional aspect, it can be rotated in any direction or angle.

The 3-D Block Pie can have as many slices as necessary to represent all the data in a given Data Set.

The 3-D Block pie can be drawn or placed on the computer screen, printed on printers or plotters, or drawn on any drawable medium.

MODIFICATIONS:

The 3-D Block Pie can have as many slices as necessary to represent all the data in Data Set 1. The 3 dimensional block Pie as seen in FIG. 3a is in the vertical direction, however they can be along an axis in any direction FIG. 5a.

As shown in FIG. 3a, the thickness (t) of each slice, can be varied in a number of different methods or choices. Among these are; (i) The height of each slice can correspond to the data of Data Set 2, or (ii) It may be incrementally thickened at predefined or user specified increments of size from one slice to the other, or (iii) It may be thickened freely by the user to any specification the user desires.

In prior existing methods, Pie charts have been regular or Simple Pie charts (FIG. 1a). Perspective pie charts (FIG. 1b) sometimes referred to as 3-D Pie charts in the industry also do exist. However their third dimension does not represent an additional Data Set or value, it simply gives a visual aesthetic perspective not a measurable data enhancement and thus do not add any informational advantage.

It is possible that with this method of data representation, a smaller slice would be covered by a larger slice or be hidden behind it. The larger pie slice may have a larger Contour size (c) and/or a larger Thickness (t). The use of computer programs in this regard can add a significant advantage, where the computer program would be designed and written in such a method that allows the viewer or user of the program to rotate the 3-D Block pie in any direction he/she desires, and thus enabling the examination or the viewing of any covered or hidden smaller Pie Slice Elements.

Since the Thickness of the Pie Slices constitute a beneficial and quantitative value, an X,Y,Z axes system with scales can be superimposed on or around the 3-Block Pie to show actual measurement scales of the Pie slices. Although the invention described here is in regards to the preferred method, it is obvious that upon reading the explanations of this invention, equivalent modifications will occur to others skilled in this art. The present invention includes all such equivalent modifications and/or alterations, and is limited only by the scope of the claims.

The same method can be used to implement the representation of different Data sets in 3 dimensional Bar or Line figures or Graphs. FIGS. 1c and 1d show the "Simple Bar" and "Simple Line" Graphs.

Each Bar corresponds to a specific data in the Data Set, and all the Bars together constitute the whole Bar graph, giving a clear correspondence of the bars to each other's height and also in relation to the whole picture of the graph including all the bars collectively. Similarly,, in a Line graph, 1 line represents 1 Data Set, with each point of data corresponding to one point on the Line curve itself.

A simple 3-D bar FIG. 1e is the Bar itself viewed at an angle such that the Bar will have a thickness. Correspondingly any one "Element" of the Bar, hereinafter referred to as "Bar Element" FIG. 2b, has a "Thickness", a "Height" and a "Width". These 3 sizes of the single Element of the one Bar element constitute the 3 distinct dimensions of the 3-D Bar Element, and all the distinct 3d Bar Elements together constitute the 3-D Bar.

Figure 2C:
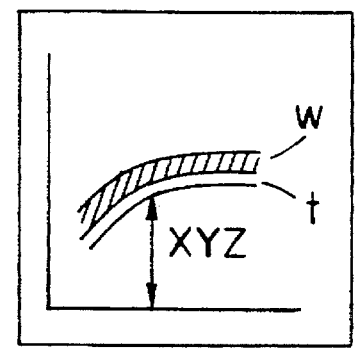
FIG. 2c is a 3 dimensional line having 3 distinct attributes of X,Y,Z value identifying a point on the line, the "Thickness" (t), and the "Width" (w)

In the case of a Line, Each point on the Line, corresponds to a specific data in the Data Set, and all the points of the line together constitute the whole line, giving a clear correspondence of the points to each other's height and also in relation to the whole picture of the graph. Usually each point on the line may be representing 1 Data Point which may include 1 numeric data or 2 or 3, these are known as the "Coordinates of the Point, and they represent the position of the point on the 2 or the 3 dimensional space, and corresponding to the X, Y, and Z axes of the Line graph. However, each data point still is considered as part of a Data set even if it is represented coordinates. A simple 3-D Line FIG. 2c is the Line itself viewed at an angle such that the Line will have a thickness. Correspondingly any one "Element" of the Line, hereinafter referred to as "Line Element" FIG. 2c, has a "Thickness" (t), and a "Width" (w). These sizes of the single Element of the one Line element constitute the 3 distinct dimensions of the 3-D Line Element, and all the distinct 3d Line Elements together constitute the 3-D Line. In traditional 3-D Bar or Line charts, the thickness of all the Bars or the Lines are the same. This is primarily because they do not represent any measure of quantity or any data, simply a perspective esthetic image.

In this new method, the Bar and Line chart figures are three dimensional, where the first and second dimensions characterize one Data set, yet the third dimension Characterizes another Data Set. Therefore, each Bar or Line Element will have 3 dimensions, and all 3 can be different than the corresponding dimensions of the other Bar or Line Elements in the Bar or the Line FIGS. 3b and 3c, where the Thicknesses of Bar Element 1, and Line Element 1 are different than the Thicknesses of Bar Element 2 and Line Element 2 correspondingly. Further, these thicknesses represent quantitative measures, information or data. The advantages of such a graph for data representation are superior to the older existing methods. In this method we name such graph as "Multi-Dimensional 3-D Block Bar and Block Line graphs", or "3-D Block Bar" and "3-D Block Line" for short. Now with this process, a beneficial graphical representation can be made where not one, but a number of Data Sets are represented in one Bar or Line graph picture.

Although these graphs can be drawn on paper or even built out of actual material such as wood etc., The use of computers to display such graphs gives an added advantage. The computer program may be written with the ability to allow the user to rotate the three dimensional Bar or Line in any direction, and thus be able to see different aspects or different perspectives of the graph.

Figure 4B:
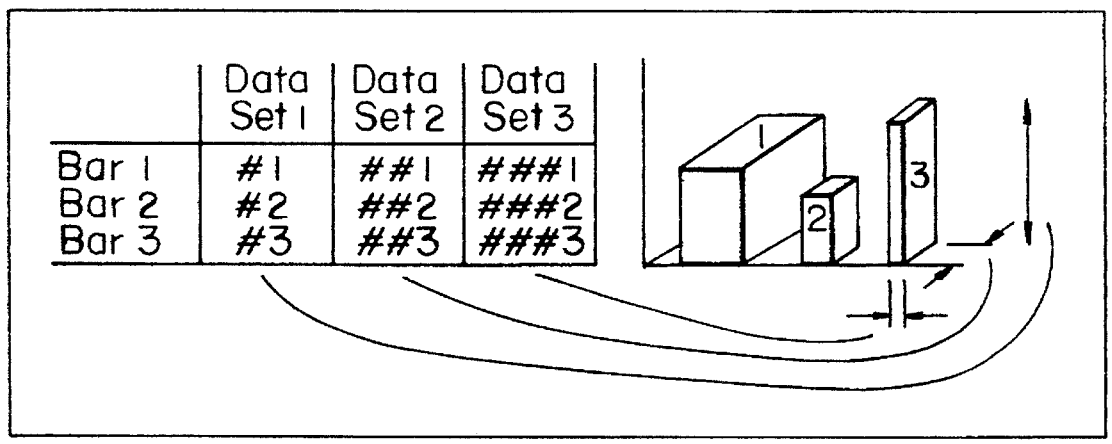
FIG. 4b shows the correspondence of the different Data Sets to the different parts of the 3-D bar figures.
Figure 4C:
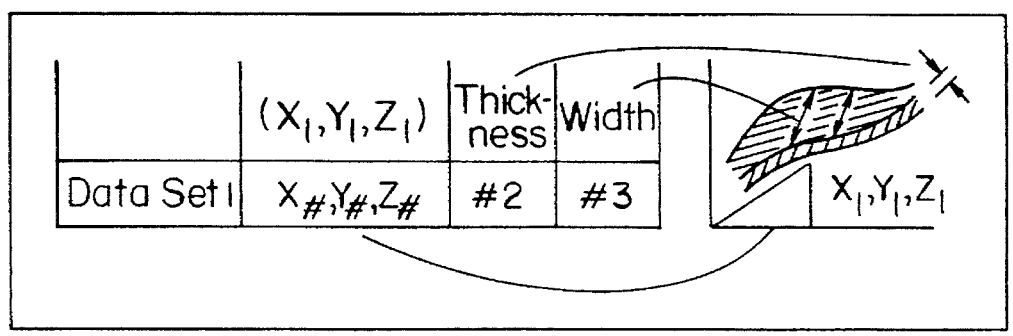
FIG. 4c shows the correspondence of the different Data Sets to the different parts of the 3-D Line.

FIGS. 4b and 4c show the correspondence of the 2 Data Sets to the different and distinct elements of the 3-D Block Bar and Line graphs.

Figure 3B:
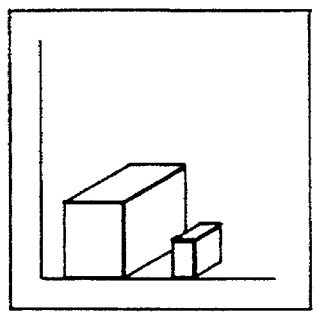
FIG. 3b is a 3 dimensional bar graph showing that the different bars can have different Thicknesses and different Heights.
Figure 3C:
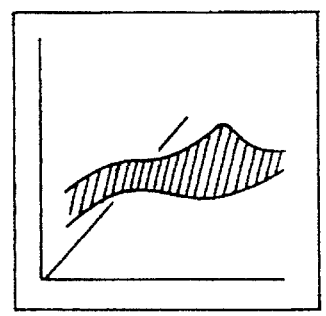
FIG. 3c is a 3 dimensional line graph or figure similar to FIG. 2c showing the 3 dimensional axes of the graph.
Figure 5B:
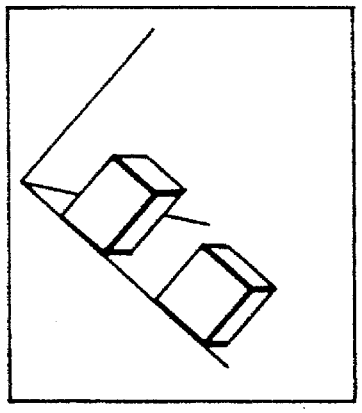
FIG. 5b is a view of the 3-D bar at a different tilt or direction than the vertical direction.
Figure 5C:
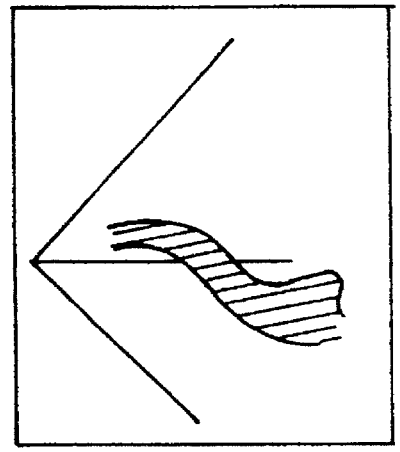
FIG. 5c is a view of the 3-D Line at a different tilt or direction.

The 3-D Block Bar and the 3-D Block Line can have as many Bars or Lines as necessary to represent all the data in Data Set 1. The 3 dimensional block as seen in FIGS. 3b and 3c are in the vertical direction, however they can be along an axis in any direction FIGS. 5b and 5c.

Figure 6B:
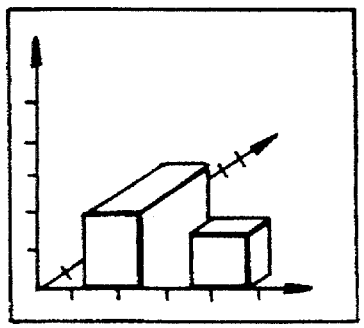
FIG. 6b shows the placement of the 3-D Bar on a 3 dimensional axes system, namely the X Y and Z axes.
Figure 6C:
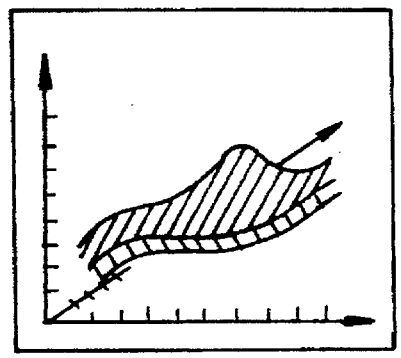
FIG. 6c shows the placement of the 3-D Line on a 3 dimensional axes system, namely the X Y and Z axes.

The Width and the Thickness of each Bar, hereinafter called "Bar Width" and "Bar Thickness" can be varied in a number of different methods or choices. Among these are; (i) The Width or Thickness of each Bar can correspond to the data of Data Set 2, or (ii) It may be incrementally thickened at predefined or user specified increments of size from one Bar to the other, or (iii) It may be thickened freely by the user to any specification the user desires. The 3-D Block Bars or Lines can be free standing as the FIGS. 3b and 3c show, or axes with scales can be placed around the 3-D Block Bar or Line FIGS. 6b and 6c to represent the size to scale correspondence of the Width and thickness of the different sides.

The 3-D Block Bar and Line can be drawn or placed on the computer screen, printed on printers or plotters, or drawn on any drawable medium. The 3-D Block Bar and Line open a new area of possibilities for beneficial representation of equations of many kinds. In Prior existing methods, Bar and Line charts have been regular or Simple Bar and Line charts FIGS. 1c and 1d. Perspective Bar or Line charts FIGS. 1e and 1f, sometimes referred to as 3-D Bar or Line charts in the industry also do exist. However their second and third dimensions do not represent an additional Data Set or value, they simply give a visual aesthetic perspective not a measurable data enhancement and thus do not add any informational advantage.

UTILITY AND BENEFITS OF THE INVENTION:

As explained above, The 3-D Block Pie is very useful since it represents a number of different Data Sets in one single Pie graph. However; newer and a greater benefits are achieved with the 3-D Block Pie since the pie slices and the pie as a whole also has a volume, which is defined as surface area multiplied by the thickness of the slices or the pie. Hence, an equation such as $$Voltage = Intensity * Resistance$$

can be uniquely represented with a 3-D Block Pie, where the Resistance could be associated to the size or the area of the slice, the Intensity could be associated to thickness of the slice, and the Voltage can be associated and represented by the volume of the slice. The 3-D Block pie opens a whole new area of possibilities for beneficial and meaningful representation of equations of many kinds.

Having thus described our invention, we claim:

1. In a data processing system, a method of graphically displaying data in a pie figure comprising:

defining at least first and second data sets relative to plural identities, the second data set including at least one value which is unequal to at least one other value of the second data set;

defining the angles of plural pie slices, each pie slice corresponding to an identity, such that the angles are proportional to data of the first data set, the angles totalling 360°;

defining a second dimension of each pie slice such that the second dimensions are proportional to data of the second data set; and generating a three dimensional display of the plural pie slices in a circular arrangement as a single pie figure, each pie slice having the defined angle and the defined second dimension.

2. A method as claimed in claim 1 wherein the second dimension is the thickness of each pie slice.

3. A method as claimed in claim 1 wherein the second dimension is the radius of each pie slice.

4. A method as claimed in claim 1 further comprising:

defining a third dimension of each pie slice such that the third dimensions are proportional to data of a third data set, the third data set including at least one value which is unequal to at least one other value of the third data set; and generating the three dimensional display of the plural pie slices with each pie slice having the defined angle and second and third dimensions.

5. A method as claimed in claim 4 wherein the second and third dimensions are thickness and radius of each pie slice.

6. A method as claimed in claim 1 further comprising displaying a linear array of values as a scale with the pie slices to measure the relative values represented by the second dimension.

7. A method as claimed in claim 1 wherein a user rotates the three dimensional display of the plural pie slices as they are being displayed to position a pie slice having a greater second dimension behind a pie slice having a lesser second dimension.

8. A method as claimed in claim 1 wherein the system performs calculations on and manipulates each of the first and second data sets.

* * * * *